Jan. 7, 1930.                H. R. PORTER                1,742,319
                                VALVE
                         Filed April 7, 1928        2 Sheets-Sheet 1

INVENTOR,
Harper R. Porter,
BY
His ATTORNEY.

Jan. 7, 1930.  H. R. PORTER  1,742,319
VALVE
Filed April 7, 1928  2 Sheets-Sheet 2

INVENTOR
Harper R. Porter
BY
His ATTORNEY.

Patented Jan. 7, 1930

1,742,319

UNITED STATES PATENT OFFICE

HARPER R. PORTER, OF NILES, OHIO, ASSIGNOR TO THE COLUMBUS MACHINE COMPANY, OF COLUMBUS, OHIO, A CORPORATION OF OHIO

VALVE

Application filed April 7, 1928. Serial No. 268,133.

This invention relates to valves intended for high pressure and high temperature service and more particularly that type of globe valve wherein the hub members for the line connections are formed separately from the main valve body or casing and subsequently applied thereto.

The principal objects of the invention are to provide a simple, economical construction which is highly resistant to distortion and extremely durable under the varying conditions of operation to which the valve is subjected and which is essentially free from gaskets or other forms of packing in the joints interposed intermediate the line connections and the valve element or plunger member.

In the accompanying drawings in which I have illustrated a globe valve embodying my invention—

Figure 1:
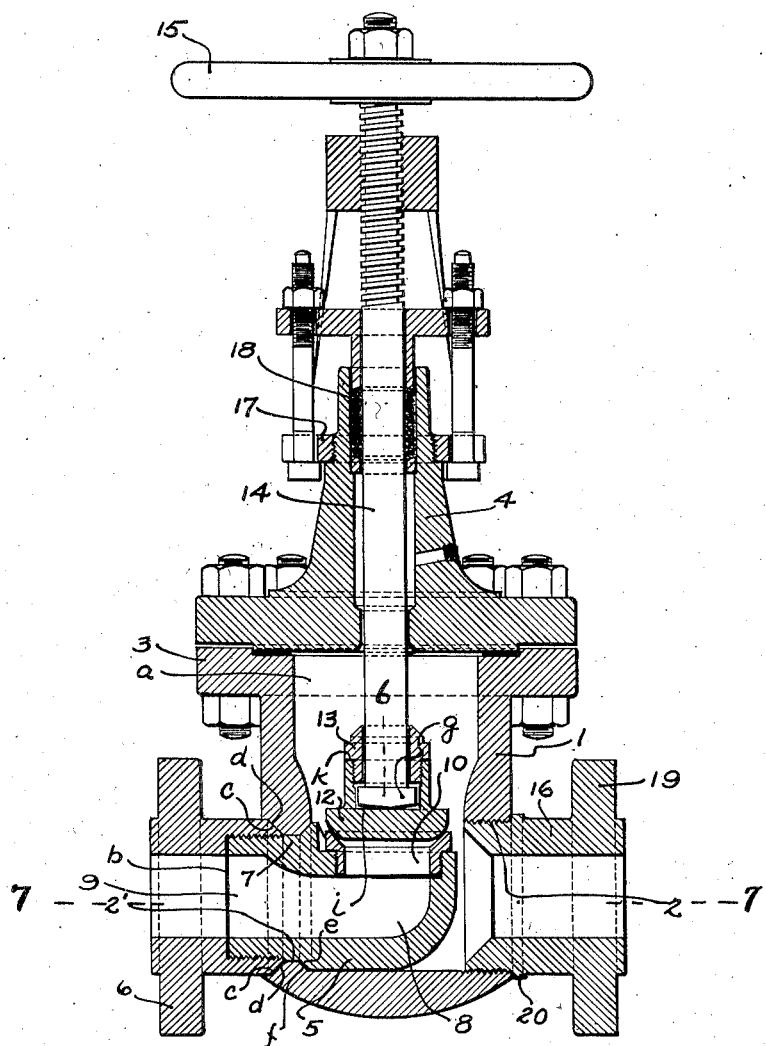
Figure 1 is a vertical section of such a valve.
Figure 3:
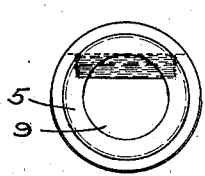
Fig. 3 is an end view viewed from the outside and Fig. 4 is a corresponding end view viewed from the inside of said bushing.
Figure 2:
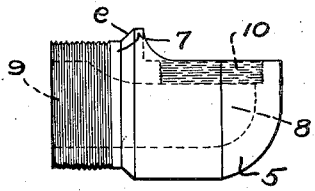
Fig. 2 is an elevation of the seat carrying internal bushing member, isolated.
Figure 4:
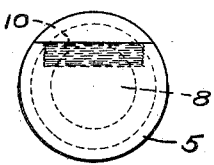
Figure 5:
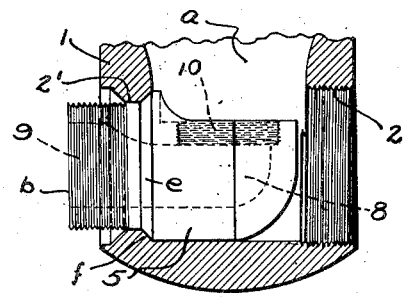
Fig. 5 is a fragmentary vertical section partially in elevation showing the first step in the assembly of the valve.
Figure 6:
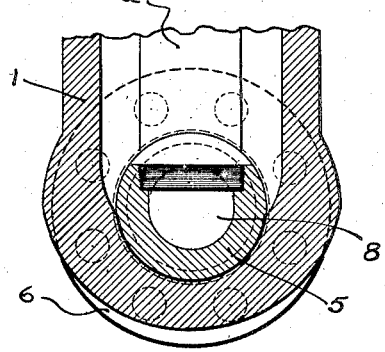
Fig. 6 is a fragmentary vertical section on the line 6—6 of Fig. 1 with plunger and seat ring omitted.
Figure 7:
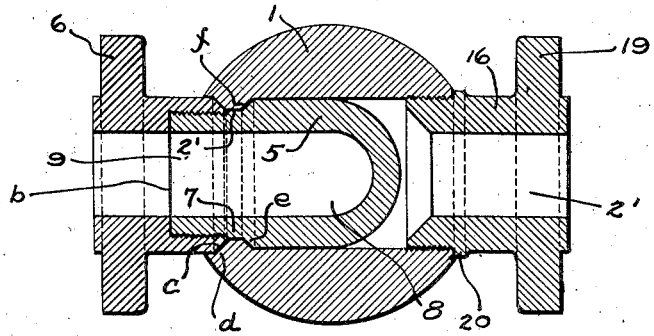
Fig. 7 is a horizontal section on the line 7—7 of Fig. 1.

Referring to the drawings and the construction shown therein, the reference numeral 1 designates a hollow valve body having a central valve chamber $a$ and provided with opposing lateral openings 2 and 2' respectively. At the upper end of the casing is provided a peripheral flange 3 which serves to secure a superstructure 4 in the usual manner to the said casing. Such superstructure is of well known construction and accordingly, except in so far as the same is illustrated, is not described in detail herein.

The aperture 2' serves to receive an internal bushing member or seat-sleeve unit 5 which is threaded at its outer end to receive a hub member 6 and provided with an intermediate flange 7 that serves as a stop to prevent the outward movement of said bushing through the aperture 2'. Said bushing member, as shown, is a hollow thimble provided with a central chamber 8, which chamber is provided with an inlet aperture 9 at one end and an outlet aperture 10 at its top, in which latter aperture is mounted a valve-seat element 11, the same being preferably in threaded engagement with the walls of the said aperture.

The said hub member 6 is counterbored or recessed to admit of the end $b$ of said bushing member projecting thereinto without offering any hindrance to the seating of the bevelled face $c$ of said hub against the corresponding countersunk bevelled face $d$ of the casing 1. Likewise the outer face $e$ of the flange 7 is bevelled so as to co-operate with the counter-sunk bevelled face $f$ of the casing 1 as shown.

A two-piece valve comprising a recessed plug element 12 and a flanged sleeve or thimble element 13, which are adapted to have threaded engagement with each other, are secured in the manner shown to a spindle or valve stem 14. The latter carries a handwheel 15 and is supported in a yoke 17 and a stuffing-box 18 carried by the bonnet member 4 in the usual manner, and has a terminal flange $g$ on one end and a tapered or rounded lower face $i$ that permits of a slight lateral movement of the valve so as to permit of the same being self-centering when it is forced upon its seat.

The hub 19, which as shown, is preferably provided with an intermediate peripheral flange 20, is threaded into the recess 19' in the manner shown, until said peripheral flange is in gas-tight engagement with the outer wall of the valve body. If desired, of course, a fillet weld may be applied around the joints between the respective hubs and the outer surface of the valve body in order to give the valve a more homogeneous and finished appearance, but when properly made, such weld is not essential in order to insure a gas-tight fit between the hubs and the valve body, since the internal bushing construction is sufficient in itself to prevent leakage on the high-pressure side of the valve and on the low pressure valve, the problem of leakage in ordinary practice is not at all serious, hence the hub 19 as applied to the valve body is capable of meeting the requirements which are obtained on the low pressure side in the line. The valve is readily applied to the spindle 14, by merely separating the two valve elements, slipping the lower element 12 over the lower end of the spindle and sliding the other element 13 over the spindle from the upper end prior to the hand-wheel 15 being applied thereto and then fitting these two valve elements together by threading the element 13 into the element 12 so that the flange $k$ tightly abuts against the upper end of the element 12.

As is evident from the foregoing construction, this valve can be expeditiously and properly assembled by unskilled labor, it being merely necessary to insert the internal bushing for the lateral apertures of the valve body casing into the position shown in Fig. 1, the valve seat being screwed into position before or after the internal bushing is introduced into the valve body. The said internal bushing is then secured in its proper relation with respect to the valve by screwing down the hub 6 until the side wall of the valve body, the internal bushing and the inner end of the hub are in gas-tight relation with each other.

In order to maintain the seat sleeve 5 in axial alignment with the axes of the apertures 2, 2' and consequently at right angles to the axis of the spindle 14 and the valve 12 during the application of the hub member 6 thereto and particularly at the moment when the said hub is finally screwed down into contact with the casing 1, the bottom of the said sleeve is of such thickness that the arched bottom outer face of the sleeve will have extended contact with the inner arched bottom face of the casing 1.

Preferably the casing 1 is formed by an extrusion process, and as originally extruded the side walls are solid being later pierced to form apertures 2, 2' but in lieu thereof the same may be cast or drop-forged and subsequently hogged out if desired.

While I have disclosed herein a preferred embodiment of my invention, various modifications thereof within the scope of the appended claims may be made without departing from the spirit of my invention.

Having thus described my invention, what I claim and desire to obtain by United States Letters Patent is:—

1. A valve assembly, comprising a hollow valve body having a plurality of lateral apertures in the side walls thereof adapted to receive the line connections, a hollow seat sleeve unit adapted to be fitted into one of said apertures and to extend beyond the sides thereof when so fitted therein, said unit having an intermediate peripheral flange to limit the outward movement of said sleeve through said aperture and said sleeve being open at its outer end and at the top thereof and having an imperforate upwardly extending wall at its inner end, a seat ring fitted in the opening at the top of the portion of said sleeve which projects within said valve body, a hub member secured with a gas-tight fit in one of the apertures of said casing and another hub member in threaded engagement with the outer end of said seat sleeve unit and having a fluid-tight fit with the outer wall of the casing immediately adjacent the aperture in which said seat sleeve unit is mounted, a bonnet secured in fluid-tight engagement to said valve body and a reciprocal spindle and valve carried thereby adapted, when lowered to seat on said seat ring, to seal communication through the seat sleeve unit and hub secured thereto and when raised off said seat to permit of free communication between the line connections secured to the respective hub members.

2. In a valve assembly, the combination comprising a hollow valve body having a plurality of apertures therethrough adapted to afford communication between the interior of said valve body and line connections secured to said body, a hollow seat sleeve unit, open at its outer end and at the top of the inner end respectively and having an imperforate inner end wall, and fitted snugly in one of said apertures, means for limiting the outward movement of said unit through the aperture in which it is mounted, a hub member in threaded engagement with said seat sleeve unit and in fluid-tight engagement with the outer wall of the casing immediately adjacent said unit, a valve seat-ring carried by said unit in alinement with the opening at the top of its inner end and a reciprocal valve member adapted to be seated upon said seat ring to seal communication between the inner chamber of said valve and a line connection secured to the hub member carried by said seat sleeve.

3. In a globe valve assembly, the combination comprising a casing having apertures therethrough adapted to receive line connections, a top terminal flange on said casing, a flanged bonnet member bolted thereto, a spindle mounted in said bonnet and a valve carried thereby, means for rotating said spindle, a hollow seat sleeve unit having openings at its outer end and at the top of its inner end respectively for affording communication with the interior of said seat sleeve unit, said unit being tightly fitted in one of said apertures, and a valve seat surrounding the opening in the top of the inner end of said unit, and the outer end of said unit projecting beyond the outer face of said casing, means for limiting the outward movement of said unit with respect to said valve casing, a hub member tightly fitted to the outer end of said unit and another hub member tightly fitted in the other aperture in said casing, which hub members are adapted to receive line connections.

4. In a valve assembly, the sub-combination comprising a body member provided with a lateral aperture, the inner and outer rims of said body member immediately adjacent said aperture being bevelled and the intermediate portion of said casing being of a cylindrical configuration, a hollow seat sleeve unit having an imperforate inner end wall and having apertures in the top of its inner end and in its outer end respectively, said seat sleeve unit having an intermediate peripheral flange which has an outer bevelled face that is of a corresponding bevel to the bevelled inner face of said casing adjacent the aperture therein, a hub member in threaded engagement with the outer end of said unit, said hub member being bevelled at its inner end to correspond to the bevel of the outer face of the casing adjacent the aperture therein and adapted to have fluid-tight engagement therewith when said sleeve unit is tightly fitted in said aperture of the casing and the said hub member is tightly screwed down upon said sleeve unit.

5. In a valve assembly, the sub-combination comprising a body member provided with a lateral aperture, a seat sleeve bushing member tightly fitted in said aperture and a portion thereof projecting therethrough, a hub member secured to the projecting portion of the bushing having fluid-tight engagement with said body, means on said bushing to limit the extent of the outward movement thereof, a seat adjacent the top of the inner end of said bushing, a valve adapted to co-operate with said seat and seal communication through said bushing when in engagement with said seat and means for raising and lowering said valve.

Signed at Niles, in the county of Trumbull and State of Ohio, this 8th day of March, 1928.

HARPER R. PORTER.